Figure 1:
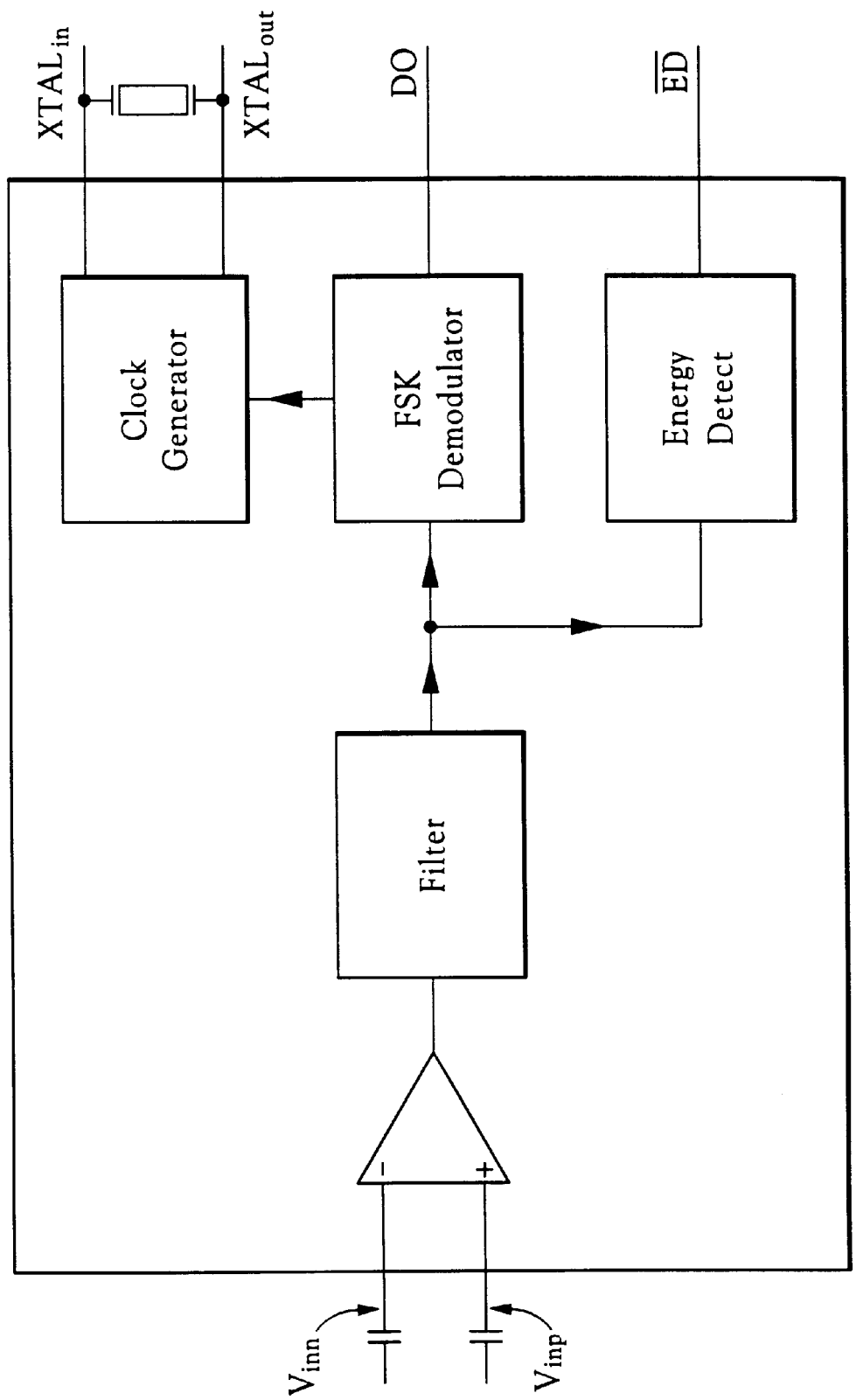

United States Patent

Drysdale et al.

[11] Patent Number: 6,014,426
[45] Date of Patent: Jan. 11, 2000

[54] TELEPHONE LINE INTEGRITY MONITORING SYSTEM

[75] Inventors: Andrew James Drysdale, Marton; Juan Sebastian Herrera, Ravenfield, both of United Kingdom

[73] Assignee: Pyronix Limited, United Kingdom

[21] Appl. No.: 08/894,831

[22] PCT Filed: Mar. 1, 1996

[86] PCT No.: PCT/EP96/00851

§ 371 Date: Dec. 15, 1997

§ 102(e) Date: Dec. 15, 1997

[87] PCT Pub. No.: WO96/27973

PCT Pub. Date: Sep. 12, 1996

[30] Foreign Application Priority Data

Mar. 3, 1995 [GB] United Kingdom .................. 9504275

[51] Int. Cl.[7] ............................. H04M 1/24; H04M 11/04
[52] U.S. Cl. ................................. 379/33; 379/34; 379/37; 379/142
[58] Field of Search .................................. 379/32, 33, 34, 379/38, 37, 42, 41, 142

[56] References Cited

U.S. PATENT DOCUMENTS 5,054,055  10/1991  Hanle et al. .
5,206,900  4/1993  Callele ................................... 379/142
5,546,448  8/1996  Caswell et al. .......................... 379/142
5,684,858  11/1997  Hartmann et al. ....................... 379/33

FOREIGN PATENT DOCUMENTS 0 624 020    11/1994   European Pat. Off. .
WO 94/21084  9/1994    WIPO .

OTHER PUBLICATIONS

Copy of International Search Report dated Jul. 12, 1996.

*Primary Examiner*—Paul Loomis
*Attorney, Agent, or Firm*—Fish & Richardson P.C.

[57] ABSTRACT

A system for monitoring for integrity of a telephone line connected between a central monitoring station and a subscriber's equipment which comprises a first module for initiating transmission of an identification code from the subscriber's equipment along the telephone line to be monitored to the central monitoring station during an incoming ringing signal; a recognition module response to said transmitted identification code for recognizing the identification code; and a second module for dropping the line after said transmitted identification codes has been recognized and before the line has been picked up.

22 Claims, 3 Drawing Sheets

Time Operation

TELEPHONE LINE INTEGRITY MONITORING SYSTEM

This invention relates to telephone line monitoring and more particularly, but not exclusively, to the monitoring of a telephone line between a subscriber's equipment and a central monitoring station.

Types of subscriber equipment which may be monitored by a central station may be of various kinds. Usually the line connection is via the Public Switch Telephone Network (PSTN) although other telephone lines may also be used. The subscriber's equipment may comprise, for example, a device for providing an electrical signal when an abnormal condition is detected at the subscriber's premises, such as, for example, afire, an unauthorised entry, or a malfunction of machinery under surveillance. Alternatively, the device may provide an electrical signal indicative of the state of certain equipment at the subscriber's premises on a routine bases. For example, the device may monitor utility meter readings, meterological measurements, or the operational data of process equipment. The invention will hitherto be described in connection with the monitoring of a telephone line between an alarm system and a central monitoring station, but it will be understood that the invention is not limited thereto, and could be used to monitor a line carrying electronic data between a central station and any of the abovementioned types of subscriber equipment, or between several pieces of subscriber equipment without the use of a central monitoring station.

When an alarm system is installed in a subscriber's premises, the premises are graded dependent upon the potential risk and the value of the property to be protected. If the premises are classed as medium grade or above, a digital communicator is fitted to the alarm system control panel. When the panel is operational, should the alarm be activated, the digital communicator will call a central monitoring station and transmit the status of the alarm system. In conventional systems, the digital communicator relies solely on the telephone line, and if this is cut it has no way of informing the central station and the central station has no way of monitoring the digital communicator. In order to overcome this problem and to monitor the line integrity, it would be possible to arrange for the digital communicator to call the central station on a periodic basis and inform the central station of its status. However, to achieve a reasonable level of monitoring, the digital communicator would need to call the central station, for example, about every ten minutes. The call charges for operating such a system would be prohibitively expensive.

An improvement on the above system has been introduced, which, in the UK, is called the British Telecom RedCARE System. This uses an existing telephone line to provide a secure communications link between the alarm system at the protected premises and the central monitoring station. To facilitate security, two modes of communication are employed a continuous inaudible low frequency tone, normally present all the time, and an audible "chirp" used to transmit alarm messages and check for the presence of the digital communicator. The "chirp" is an FSK (Frequency Shift Keying) modulated signal and contains information about the status of the alarm system. In installing such a system, it is necessary for the telephone exchange to be informed, and for the appropriate connection at the exchange to be made, to enable correct operation of the system. The telephone line used to monitor the alarm system may be used for voice communication, but cannot be shared with modems or fax machines. The digital communicators required for the RedCARE system are two to three times the pride of conventional digital communicators and the charges for using the RedCARE system are more expensive than standard telephone charges.

The installation of such a RedCARE system is described in a brochure entitled EUROSTU Installation Guide published by Versus Technology Limited of Aldershot, Hants. The operation of the system is described in UK patent application no. GB2115651. The entire disclosures of these documents are incorporated herein by reference.

A further service which has recently been introduced by the telephone companies is entitled Caller Number Delivery (CND). In the UK the system is known as British Telecom Caller ID. This service is not in any way concerned with the monitoring of subscriber's equipment, but has been introduced to help combat the ever increasing number of nuisance calls. The service allows a called subscriber to receive a calling party's number during the ringing cycle. The data corresponding to the caller number is transmitted to the subscriber's premises when the telephone is still on-hook and a voice path has been established. If power ringing is used to establish the voice path, then data transmission occurs during the silent interval between the first and second power ringing signal. This data takes the form of an FSK modulated signal. If the telephone receiving the call supports the Caller ID service, it will decode the calling number and display this number to the subscriber. The display allows the subscriber to make an informed decision as to whether to answer the telephone or not.

Microchips to facilitate the Caller ID service are commercially available and a typical microchip and caller identification circuit is described in a brochure entitled "SC11210/SC11211 Caller Identification Circuit" published by Sierra Semiconductor Corporation (1991), the entire disclosure of which is incorporated herein by reference. The Caller Identification Circuit described is designed to convert frequency shift key (FSK) data to asynchronous serial data. This device is implemented utilising complimentary metal oxide semiconductor (CMOS) and operated from a single SV supply. FIG. 1 shows its block diagram. The incoming data is AC coupled by external capacitors on to pins $V_{INN}$ and $V_{INF}$. These pins are connected to differential input operational amplifier (Opamp) with unity gain. The output of the Opamp is then passed through a band limiting filter. The output of the filter is passed to an energy detect circuit and a FSK demodulator. The energy detect circuit monitors the output of the band-pass filter. When the energy levels are valid the $\overline{ED}$ pin is driven low. When the energy levels are not valid the $\overline{ED}$ pin is driven high. The FSK demodulator has an associated clock generator circuit which is driven from an external crystal connected to pins $XTAL_{in}$ and $XTAL_{out}$. The FSK demodulator outputs the asynchronous caller ID data on pin D0.

The present invention provides a method for monitoring the integrity of a telephone line connection between a first piece of equipment and a subscriber's equipment fitted with a communication device. In the method of the invention, a caller number delivery (CND) system can be utilised to provide information about the integrity of the telephone line connection without picking up the telephone line.

According to one aspect of the present invention there is provided a telephone line integrity monitoring system for monitoring the integrity of a telephone line connection between a first piece of equipment and a subscriber's equipment which comprises:

means for initiating transmission of an identification code by means of the subscriber's equipment along the telephone line to be monitored to the first piece of equipment during an incoming ringing signal;

recognition means responsive to said transmitted identification code for recognising the identification code; and means for dropping the line after said transmitted identification code has been recognised and before the line has been picked up.

In a further aspect, the invention provides a method of monitoring a telephone line connection between a first piece of equipment and a subscriber's equipment which comprises the steps of:

initiating transmission of an identification code by means of the subscriber's equipment along the telephone line to be monitored to the first piece of equipment during an incoming ringing signal;

recognising the identification code by means of recognition means at the first piece of equipment; and dropping the line after said transmitted identification code has been recognised and before the line has been picked up.

The transmitting means is preferably a digital communicator, for example, a Paracom communicator made by Pyronix Limited, or other suitable commercially available digital communicators.

The first piece of equipment is preferably a central monitoring station.

Alternatively, the first piece of equipment may be a further subscriber's equipment.

The subscriber's equipment can, for example, be an intruder alarm system, such as, for example, an alarm system comprising an Octagon control panel made by Pyronix Limited. Such a system may be connected to the central station via the Public Switched Telephone Network (PSTN).

The first piece of equipment can be provided, for example, with a digital receiver for receiving and recognising the transmitted identification code from the subscriber's digital communicator.

The means for dropping the line after the identification code has been transmitted but before the line has been picked up can, if desired, be connected to the first piece of equipment, but preferably it is associated with the digital communicator at the subscriber's premises. In preferred embodiments of the invention to be described later, both the first piece of equipment and the subscriber's equipment are provided with digital communicators having associated therewith line dropping means.

One or both digital communicators are preferably provided with line dropping means comprising a tone detection circuit which can detect the ringing tone at the receiver, and a timer which will drop the line after a predetermined interval, for exmaple, around 3 seconds after the ringing tone has been detected. One or both digital communicators are also preferably provided with an answer delay which ensures that in normal, non-event conditions, the line drop means is activated by the timer before the line is picked up.

The first piece of equipment will normally have a number of subscribers each of whom will have equipment connected to the first piece of equipment by a telephone line. The first piece of equipment will hold stored information about each of the digital communicators to be monitored. The monitoring system can be operated in two ways, a polled mode or a timed mode.

Timed Operation

When the monitoring system operates in a first timed mode, the central station is provided with a timer or timers set for each subscriber, and will expect to receive a call from each of the digital communicators at pre-determined intervals. The subscriber digital communicators are, of course, also provided with timers which are pre-set to the same time interval. When each subscriber's digital communicator transmits its identification code to the central station, the recognition means will decode the caller identification code and reset the central station timer for that digital communicator. If the subscriber's digital communicator has not changed state since it last reported its status, the subscriber line-drop means will drop the line after the caller ID has been sent. If the line continues to ring, however, for example because an alarm or other event condition has arisen, the central station will pick up the line, receive the status information from the subscriber's digital communicator and report the status to the operator.

In a second timed mode, if for some reason the central station does not receive a call from a monitored digital communicator in the pre-defined time period, it will then call that digital communicator, and, when the central station has transmitted its caller ID to the monitored digital communicator, it will drop the line. If the subscriber's digital communicator is still connected and operational, it will decode the caller ID and recognise the number as that of its central monitoring station. It will then call back the central station, either on the same number or another number with which it is programmed, and after the subscriber caller ID has been transmitted the subscriber digital communicator will drop the line, thus acknowledging the previous call from the central station. If the central station does not receive an acknowledgement call from the subscriber's digital communicator within a predetermined period, it will inform the operator that an abnormal event has been detect. The central station is able to recognise that the acknowledgement call is from the correct subscriber digital communicator from the caller ID.

Polled Operation

When the monitoring system of the invention is operated in polled mode, the central monitoring station prompts each digital communicator, at a pre-determined interval, to acknowledge that it is still connected and operational. The central station transmits a call to each digital communicator at a period dependent upon the assessed potential risk. This period can vary depending upon the status of the subscriber's equipment. The central station calls each subscriber digital communicator in turn and after its caller ID has been transmitted the central station then drops the line. The digital communicator of subscriber I receives and decodes the caller ID from the central station. If the identification code corresponds to that of the central station, the digital communicator of subscriber I then calls back the central station to acknowledge the communication, again dropping the line after the subscriber caller ID has been transmitted. The central station will receive the call from the digital communicator of subscriber I, decode the subscriber caller ID, and, if this corresponds to the details of subscriber I which it has stored in its memory, it will then call the digital communicator of subscriber II in the sequence, and so on. If the central station does not receive a correct acknowledgement call from subscriber I within a predefined period it will inform the operator that an abnormal event has been detected.

In either of the above modes of operation, if the state of the alarm system changes, the subscriber's digital communicator will call the central station in the usual way. The central station will pick up the line if it continues to ring after the caller ID has been received and will read the status of the alarm system. The central station operator is then informed that an abnormal event has been detected.

It is, of course, possible for the subscriber's digital communicator and the central station digital communicator to call each other on different lines, which can be individually monitored. It is also possible for any part of the system to call another location, for example, to confirm that the system is operational, to raise an alarm, or for any other purpose. Two or more control stations could also operate the system in tandem.

Figure 2:
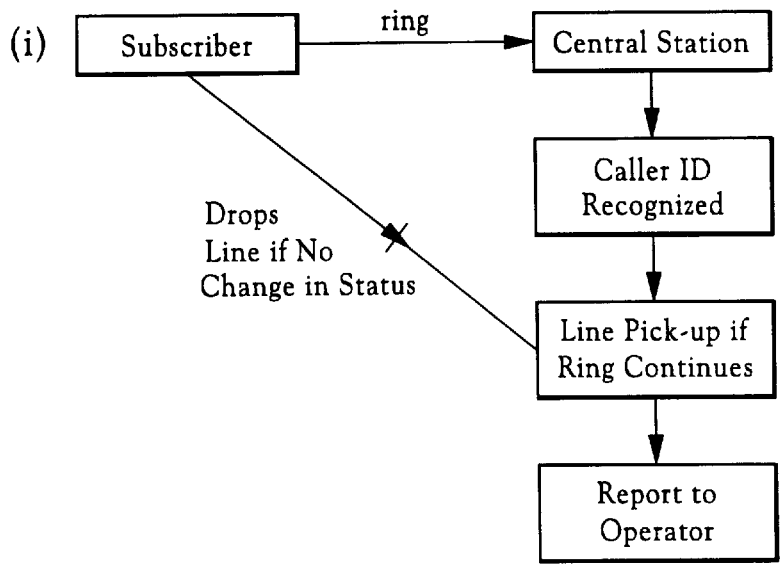
Figure 2:
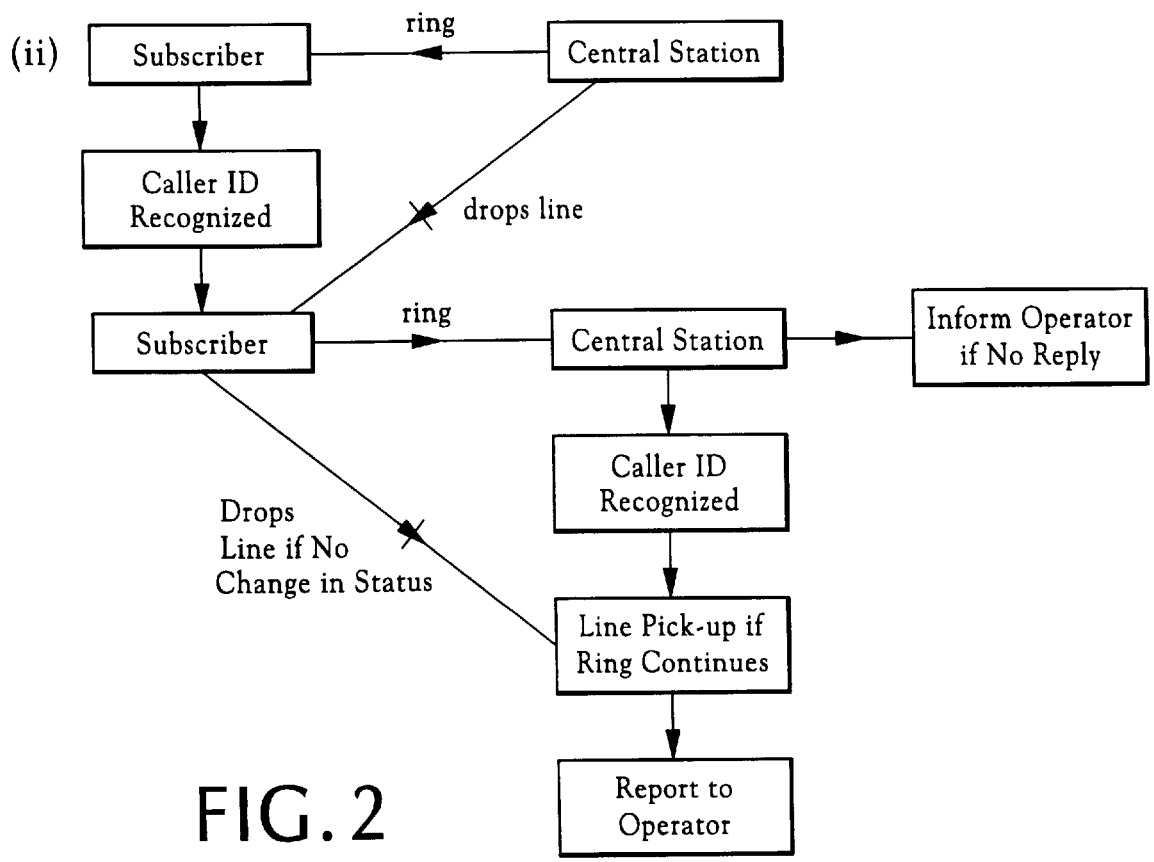
Figure 3:
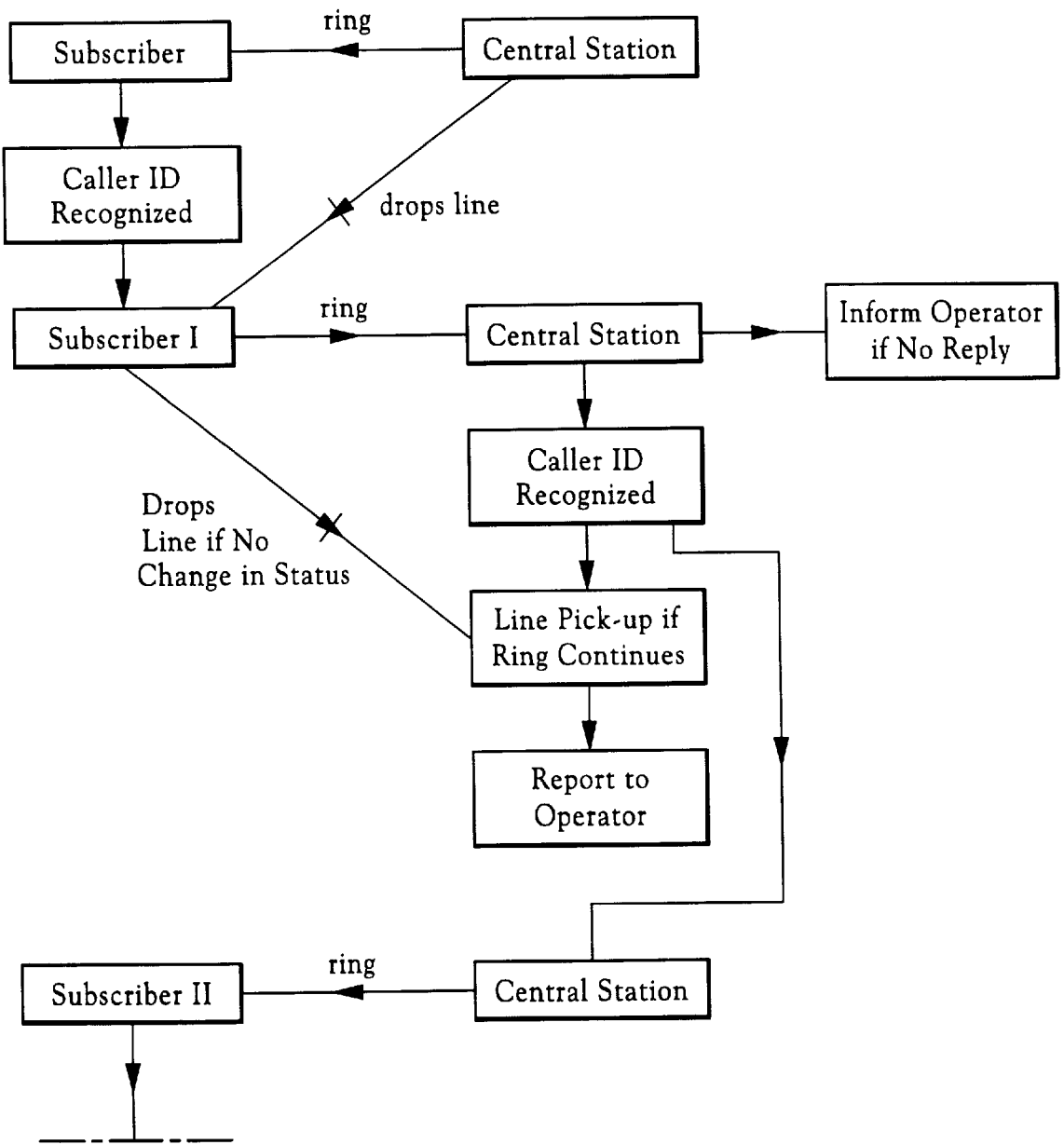

Schematic diagrams showing the operation of the timed and polled monitoring systems are illustrated respectively in FIGS. 2 (i) and (ii) and FIG. 3 of the accompanying drawings.

By using the Caller ID or Caller Number Delivery (CND) system as a basis for a telephone line monitoring system, the invention provides a simple low cost solution to the problem of monitoring the integrity of a telephone line and improving security between a central station and monitored subscriber's equipment. Standard microchip devices are available suitable for decoding the caller ID, for example, the microchips SC11210 and SC11211 manufactured by Sierra Semiconductor Corporation previously referred to, and these can readily be connected to a suitable digital communicator. In preferred embodiments of the invention, the line integrity monitoring can be achieved without picking up the telephone line and should not therefore incur any charges form the telephone company. The line integrity monitoring system of the invention has the further advantage that it does not require any modifications at the telephone exchange. In appropriate circumstances, if the subscriber's digital communicator has a hand-over relay, other devices such as faxes and modems can also utilise the same monitored telephone line.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). This invention extends to any novel one, or any novel combination, of the features disclosed in this specification (including any accompanying claims, abstract and drawings), or to any novel one, or any novel combination, of the steps of any method or process so disclosed.

We claim:

1. An alarm system comprising:
   telephone line integrity monitoring means for monitoring the integrity of a telephone line connection between a first piece of equipment and a subscriber's equipment including
   means for initiating transmission of an identification code from the subscriber's equipment along the telephone line to be monitored to the first piece of equipment during an incoming ringing signal;
   recognition means responsive to the transmitted identification code for recognizing the identification code; and
   means for dropping the line after the transmitted identification code has been transmitted and before the line has been picked up.

2. A system according to claim 1, wherein the first piece of equipment is a central monitoring station.

3. A system according to claim 1, wherein the first piece of equipment is a further subscriber's equipment.

4. A system according to any one of the proceding claims, in which the subscriber's equipment comprises an intruder detection alarm.

5. A system according to claim 1, in which the transmission means comprises a digital communicator.

6. A system according to claim 1, in which the identification code is transmitted along the telephone line to be monitored between the first and second power ringing signals.

7. A system according to claim 1, in which the recognition means comprises a digital receiver.

8. A system according to claim 1, in which the subscriber's equipment is connected to the first piece of equipment via the Public Switched Telephone Network (PSTN).

9. A system according to claim 5, in which the means for dropping the line after the identification code has been transmitted is associated with the subscriber's digital communicator.

10. A system according to claim 1, in which both the first piece of equipment and the subscriber's equipment are provided with digital communicators having associated therewith line dropping means.

11. A system according to claim 9, in which the line dropping means comprises a tone detection circuit which can detect the ringing tone at the receiver, and a timer which drops the line at a predetermined interval after the ringing tone has been detected.

12. A system according to claim 10, in which the digital communicators are provided with an answer delay such that in normal, non-alarm conditions, the line drop means is activated by the timer before the line is picked up.

13. A system according to claim 1, in which the first piece of equipment and the subscriber's equipment are each provided with a timer or timers which are preset such that the first piece of equipment expects to receive a call from the transmitting means at predetermined intervals.

14. A system according to claim 1, in which the first piece of equipment is provided with a timer such that the first piece of equipment prompts each subscriber's transmitting means at predetermined intervals, to acknowledge that it is still connected and operational.

15. A system according to claim 1, in which the first piece of equipment is connected to equipment at a plurality of subscribers.

16. A method of monitoring the integrity of a telephone line connection between a first piece of equipment and a subscriber's equipment which comprises:
   initiating transmission of an identification code by means of the subscriber's equipment along the telephone line to be monitored to the first piece of equipment during an incoming ringing signal;
   recognising the identification code by means of recognition means at the first piece of equipment; and
   dropping the line after said transmitted identification code has been recognised and before the line has been picked up.

17. A method according to claim 16, in which the first piece of equipment is provided with a timer or timers set for each subscriber, and expects to receive a call from each of the subscribers at predetermined time intervals as established by the timer or timers.

18. A method according to claim 17, in which, after each subscriber's transmitting means initiates the transmission of its identification code to the first piece of equipment, the recognition means decodes the caller identification code and resets the first piece of equipment's timer for that subscriber and in which, if the subscriber's equipment has not changed state since it last reported its status, the subscriber's equipment drops the line after the subscriber's identification code has been transmitted and recognised.

19. A method according to any of claims 16 to 18, in which, if the first piece of equipment does not receive a call from a monitored subscriber's equipment in the pre-determined time period, the central station calls that subscriber's equipment, and, when the central station has initiated the transmission of its identification code to the subscriber's equipment it drops the line; and when the subscriber's equipment recognises the identification code of the first piece of equipment, it transmits the subscriber's identification code to the first piece of equipment and drops the line, thus acknowledging the previous call from the first piece of equipment.

20. A method according to claim 16, in which the first piece of equipment prompts each subscriber's equipment, at pre-determined intervals, to acknowledge that it is still connected and operational.

21. A method according to claim 20, in which the first piece of equipment transits a call to each subscriber in turn, at a period dependent upon the assessed potential risk, and after its identification code has been transmitted drops the line; recognition means associated with the subscriber's equipment recognises the identification code from the first piece of equipment; and the subscriber's equipment calls back the first piece of equipment to acknowledge the communication, dropping the line after its identification code has been transmitted.

22. A method according to claim 16, in which, if the first piece of equipment does not receive an appropriate call or acknowledgment from a subscriber's equipment, or if the subscriber's equipment continues to ring the first piece of equipment after its identification code has been transmitted and recognized, the first piece of equipment reports that an abnormal event has been detected.

* * * * *